(12) United States Patent
Liu

(10) Patent No.: US 6,826,965 B1
(45) Date of Patent: Dec. 7, 2004

(54) ANTI-PARALLEL TAG FLOW MEASUREMENT SYSTEM

(75) Inventor: Yi Liu, Bolton, MA (US)

(73) Assignee: Panametrics, Inc., Waltham, MA (US)

( * ) Notice: Subject to any disclaimer, the term of this patent is extended or adjusted under 35 U.S.C. 154(b) by 38 days.

(21) Appl. No.: 09/702,074

(22) Filed: Oct. 30, 2000

(51) Int. Cl.[7] ............................... G01F 1/66; G01F 1/20

(52) U.S. Cl. ............................... 73/861.29; 73/861.31; 73/861.18

(58) Field of Search ................... 73/861.29, 861.31, 73/861.27, 861.06, 861.95, 861.18, 861.25, 861.26, 861.28

(56) References Cited

U.S. PATENT DOCUMENTS

| | | | | |
|---|---|---|---|---|
| 3,751,979 A | * | 8/1973 | Ims ............................ | 73/181 |
| 4,003,256 A | * | 1/1977 | Donelan et al. ......... | 73/861.27 |
| 4,103,551 A | * | 8/1978 | Lynnworth .............. | 73/661.27 |
| 4,375,767 A | * | 3/1983 | Magori .................... | 73/861.18 |
| 4,528,857 A | * | 7/1985 | Bruner .................... | 73/861.18 |
| 4,598,593 A | * | 7/1986 | Sheen et al. ............. | 73/861.04 |
| 4,787,252 A | | 11/1988 | Jacobson et al. | |
| 4,922,750 A | * | 5/1990 | Magori ..................... | 73/118.2 |
| 5,503,035 A | * | 4/1996 | Itoh et al. ................. | 73/861.23 |
| 5,533,408 A | * | 7/1996 | Oldenziel et al. ........ | 73/861.06 |
| 5,650,571 A | | 7/1997 | Freud et al. | |
| 5,856,622 A | * | 1/1999 | Yamamoto et al. ........... | 702/48 |
| 6,009,760 A | | 1/2000 | Jakkula et al. | |
| 6,047,602 A | | 4/2000 | Lynnworth | |
| 6,293,156 B1 | * | 9/2001 | Shen et al. .............. | 73/861.06 |

* cited by examiner

Primary Examiner—Edward Lefkowitz
Assistant Examiner—Lilybett Martir
(74) Attorney, Agent, or Firm—Iandiorio & Teska (57) ABSTRACT

A tag flow measurement system wherein a first and a second measurement path are provided across a flowing fluid, and a receiver in each path receives signals modulated by scatters in the fluid. The direction of signal propagation in one path faces in an opposite sense to, e.g., is anti-parallel to, the direction of propagation in the other path, and the two receiver outputs are correlated to determine a time interval representative of flow velocity. In one embodiment each path is defined by a transmitter on one side of the conduit and a receiver on the other side of the conduit, and the positions or orientations of transmitter and receiver are reversed in the second pair. Thus, the first transmitter may lie on the same side of the conduit as the second receiver, and the second transmitter may lie on the same side of the conduit as the first receiver. Diametral or chordal paths may be used. A prototype clamp on system detects flowing air at atmospheric pressure in a schedule 40 one inch steel pipe over an extended range, at flow rates as low as several meters per second. The coherent crosstalk between one transmitter and the receiver of the other pair is greatly reduced, and travels only through the pipe and not across the fluid, so the cross-correlation signal to noise ratio may be enhanced by a factor of ten or more over that of a conventional tag correlation system. This allows effective operation in small conduits, at small spacings, at low flows and in other difficult measurement situations. Each transmitter may operate at a different frequency, and the received signals may be demodulated in phase quadrature to further enhance channel separation and received signal power. Frequencies or frequency pairs in the range of approximately one to four megahertz may be useful for one inch pipe, while lower frequencies in the range of 0.1 to 0.5 megahertz are advantageously employed for larger conduits. Spacings may be ¼ to 1/10 of a pipe diameter, and a common spacing, e.g., two inches may be employed for conduits over a diameter range of one to ten inches with high accuracy.

15 Claims, 7 Drawing Sheets

TABLE 1. REPEATABILITY TESTS ON PARALLEL(P) TAG AND ANTIPARALLEL(AP) TAG METHODS.

| RUN NUMBER | MOTOR SPEED (RPM) | VELOCITY (ft/s) | | | SNR | |
|---|---|---|---|---|---|---|
| | | SCALED REFERENCE | TAG(P) | TAG(AP) | P | AP |
| 1 | 3000 | 6.8 | — | 8.6 | — | 3.7 |
| | 6000 | 15.3 | — | 17.4 | — | 3.2 |
| | 9000 | 25.7 | — | 27.6 | — | 4.8 |
| | 26400 | 95.6 | 92.3 | 92.7 | 1.6 | 14.6 |
| 2 | 3000 | 6.8 | 8.8 | 8.9 | 0.8 | 4.6 |
| | 6000 | 15.3 | 18.3 | 18.2 | 2.2 | 6.2 |
| | 9000 | 25.7 | 28.9 | 28.4 | 3.1 | 7.7 |
| 3 | 3000 | 6.8 | 8.8 | 8.8 | 1.7 | 6.1 |
| | 6000 | 15.3 | 18.6 | 18.5 | 6.5 | 7.7 |
| | 9000 | 25.7 | 28.2 | 28.7 | 11.0 | 10.0 |
| 4 | 3000 | 6.3 | 8.7 | 8.8 | 1.2 | 4.3 |
| | 6000 | 15.8 | 18.3 | 18.1 | 3.9 | 7.4 |
| | 9000 | 25.3 | 28.2 | 28.1 | 7.3 | 9.7 |
| 5 | 3000 | 6.8 | — | 8.7 | — | 3.8 |
| | 6000 | 15.8 | 18.7 | 18.1 | 1.1 | 6.8 |
| | 9000 | 25.3 | 28.4 | 28.2 | 2.9 | 10.4 |

ANTI-PARALLEL TAG FLOW MEASUREMENT SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to measurement of fluid flow and to such measurements performed by receiving and processing ultrasonic signals that are transmitted into the fluid. It particularly relates to tag flow meters wherein inhomogeneities or turbulence in the fluid itself, or matter such as bubbles, droplets or particles that are moving in the fluid flow, constitute "tags" that modulate the ultrasonic signal. For operation of such tag flow measurement systems, signals are generally launched across the fluid along two parallel paths and received by separate receivers after being modulated by the fluid flow.

This mode of measurement, useful for certain flows that naturally contain, or are seeded, heated, agitated or injected to include, discrete entrained scatterers, offers a number of advantages. By detecting a similar pattern of modulation on the two paths at different times, the fluid velocity may be directly derived from the distance between paths divided by the elapsed time between occurrence of correlated modulation patterns. Thus, baseline calibration steps for amplitude, density, temperature or the like, commonly required for other types of ultrasonic measurements, are not needed. Moreover, tag measurements often are applicable to situations in which the scatterers would introduce too much attenuation or noise for other modes of ultrasonic measurement to be effective. Tag measurements are also useful when most of the interfering noise is stationary, e.g., coherent crosstalk, but not overwhelming.

In general, an effective tag measurement requires that the tags or modulators present in the fluid flow be displaced coherently, i.e., as a group along the direction of fluid flow so that they modulate the signal similarly as they cross each of the interrogation paths. This may require that the paths be located relatively close together with a spacing that decreases with decreasing flow velocity. When the transducers are mounted outside the conduit wall, or are not well isolated acoustically from the conduit wall, as frequently occurs in clamp-on measurement applications, this may result in high levels of noise and crosstalk, substantially degrading the signal to noise ratio and making effective correlation of the two received tag-modulated signals difficult or impossible.

Recently, Chang Shen and Saul Jacobson have proposed, in commonly owned U.S. patent application Ser. No. 09/417,946 filed Oct. 13, 1999, that a clamp-on tag measurement system may be effectively implemented, even for relatively low impedance fluids such as low pressure steam traveling in a steel conduit, by arranging the transmitter to energize a region of the wall and positioning plural receivers to discriminate received signals along different parallel paths of known spacing. That patent application describes a tag measurement method using two different signal frequencies in the two transmitter/receiver pairs. The entire specification of that patent application is hereby incorporated herein by reference. While the approach described therein has extended the feasibility of clamp-on measurements to low pressure gases in noisy conduits, the nature of such clamp-on applications and systems involves a low signal to noise ratio, and in many practical applications involving small pipes or low flow rates, such as in domestic heating plants where a fluid such as wet steam otherwise appears appropriate for tag measurement, the environment itself provides such a level of intrinsic system noise that even the improved transducer and processing configurations described above may fail to yield discernible signals, or fail to provide effective and repeatable correlations.

It is therefore desirable to provide a more effective tag flow measurement system.

It is also desirable to provide an ultrasonic tag flow measurement system applicable to small conduits, and/or noisy environments.

It is further desirable to provide an ultrasonic measurement system adapted to perform either continuous or occasional measurements with certainty and accuracy.

It is also desirable to provide an ultrasonic tag flow measurement system useful for measuring flow of steam, flare gas, and industrial process gases in small conduits.

SUMMARY OF THE INVENTION

One or more of the foregoing results are obtained in accordance with the present invention by providing a tag flow measurement system wherein a set of preferably clamp-on transducers define first and a second measurement paths spaced apart along the conduit and directed across a fluid flowing in the conduit such that a receiver in each path receives signals modulated by scatterers in the fluid. The direction of signal propagation in one path is in an opposite sense, e.g., anti-parallel, to the direction of propagation in the other path, and a correlation processor operates on both received signals to determine the flow rate. In one embodiment each path is defined by a transmitter on one side of the conduit and a receiver on the other side of the conduit, with the positions of transmitter and receiver being reversed in the second pair. Thus, typically, the first transmitter lies on the same side of the conduit as the second receiver, and the second transmitter lies on the same side of the conduit as the first receiver. A communicating transmitter and receiver may be diametrically opposed, or may be positioned at opposite ends of a chordal path.

Advantageously, the system may be applied to small conduits having a diameter below 100 millimeters, and it has even been found effective, for example, on a schedule 40 one inch steel pipe carrying low pressure steam or gas. The use of anti-parallel paths greatly reduces coherent crosstalk extending from one transmitter to the receiver of the other pair, and signal to noise ratio may be enhanced by a factor of ten or more, allowing effective correlation of the two received signals. Preferably, each transmitter operates at a different frequency, and the received signals are received and demodulated in phase quadrature to further enhance signal quality. Frequencies or frequency pairs in the range of approximately one to four megahertz may be useful for one inch pipe, while lower frequencies in the range of 0.1 to 0.5 megahertz are suitable for larger conduits.

BRIEF DESCRIPTION OF THE DRAWINGS

These and other features of the invention will be understood from the description of illustrative embodiments below, taken in together with the Figures, wherein.

DETAILED DESCRIPTION

Figure 1:
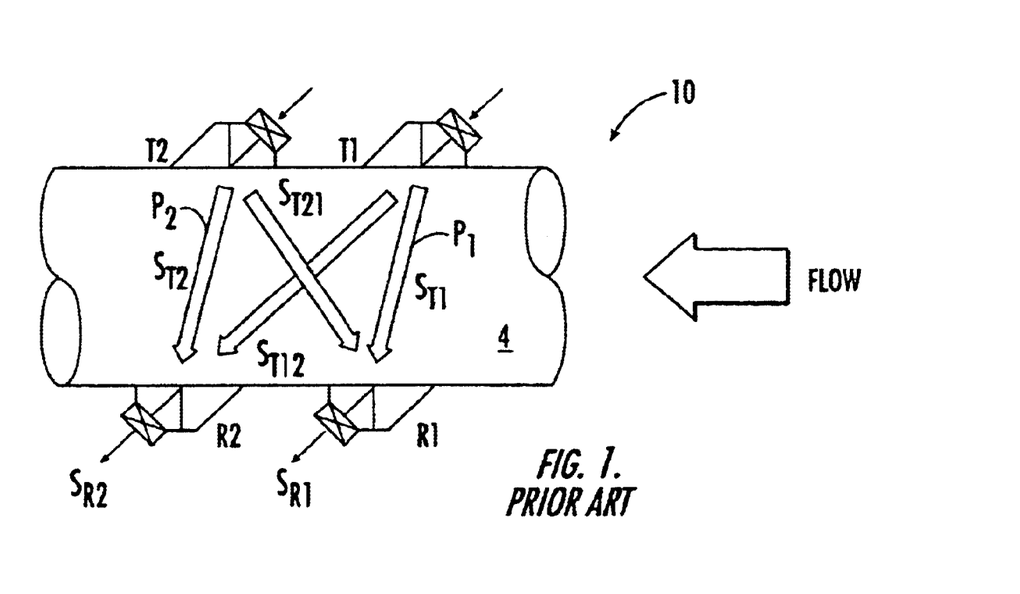
FIG. 1 illustrates a prior art tag measurement system.

FIG. 1 illustrates a prior art transducer arrangement and signal path in a clamp-on tag flow meter arrangement 10. As shown, a first transducer pair T1, R1 attaches to a conduit 4 to launch the transducer signal denoted $S_{T1}$ such that the fluid-borne portion of the signal crosses the fluid at a defined path angle $\theta_3$ on path P1, and a second transducer pair, T2, R2 is positioned offset a distance L along the flow stream to define second fluid path P2 for a transmitted signal $S_{T2}$. P2 is located parallel to, and a short but fixed or known distance along the conduit from, path P1. Thus, for entrained scatterers in a well behaved flow, the signal modulation produced by a given set of tags will be substantially identical at the two different times when that set of tags pass through the respective beams. Apart from profile considerations, flow velocity v is then given by this time interval ($\tau$) and the path spacing L, namely $v=KL/\tau$, where K is a meter factor that takes into account the flow profile and the manner in which the sound beams interact with the flow along the paths. In most cases $\theta_3$ is small—commonly 0°, or 5°–7° for air or steam, or 15°–25° for hydrocarbon liquids or water, respectivel As shown in FIG. 1, each receiver also receives crosstalk from the transmitter of the other pair. The interfering signal from transmitter T2 to receiver R1 is denoted $S_{T21}$, and the interfering signal to receiver R2 from transmitter T1 is denoted $S_{T12}$. The interfering signals are propagated in large part, and possibly with high amplitude, through the conduit wall. Furthermore, when a region of the wall is energized with a CW signal, this gives rise to a periodic sound field with coherent noise along additional paths through the fluid. As described in the aforesaid patent application, to address the wall-borne component, the transducers of a pair may be positioned closely to place a receiver in a quiet shadow zone, and special wall damping may be applied to reduce coherent or correlated noise propagating along the pipe. However, such isolation techniques have their limits. In a typical path spacing on a three inch schedule 40 steel pipe, the unwanted signal or crosstalk received from the other transducer may be approximately equal to the amplitude of the signal from the proper transmitter. Moreover, even when configured as described in the above-referenced patent application, only a small percentage of the signal received from the transmitter of a transmitter/receiver pair (e.g., of the signal $S_{T1}$ received by receiving transducer R1) consists of the desired information-bearing signal transmitted through the fluid and modulated with the appropriate tag information. The received signal also includes short circuit noise carried by the wall, as well as other ringing, mode-converted signal, echoes and system noise. As a result, for smaller conduits such as a one inch schedule 40 pipe, where the short circuit signal suffers little attenuation and dispersion, the signal to noise ratio is so low that it may prevent effective tag correlation measurements. This may be the case even when transmitting and demodulating with different frequencies on the two paths as described in the above-referenced patent application, and even when applying damping material to reduce the level of crosstalk or short circuit signal traveling within the conduit wall. In one experiment to determine signal levels for such a configuration, for air at atmospheric pressure, the received crosstalk signal $S_{T12}$ was 1.7V, while $S_{T2}$ was 0.06V and constituted too low a component to be able to permit a meaningful measurement.

Figure 2:
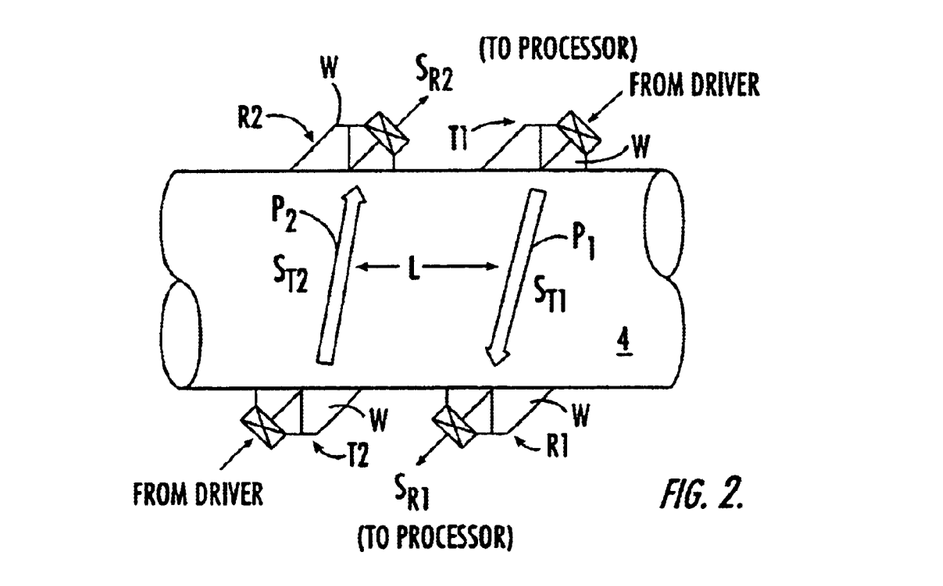
FIG. 2 illustrates a tag measurement system of the present invention.

FIG. 2 illustrates a tag measurement system 20 of the present invention. As shown, transmitter/receiver pairs define two paths P1, P2 with the signal paths being antiparallel and separated by a distance L. That is, not only are the paths at different locations, but the signal of one path traverses the fluid in the opposite sense from the signal of the other path. Thus, T1 and R2 lie on one side of the pipe and T2 and R1 lie on the other side of the pipe. Applicant has discovered that despite this reversal of the path direction, the signal modulation passively introduced along the two paths by eddies or other scatterers in the flowing fluid remains relatively similar; the signals received along the two paths are well-correlated. Advantageously, the reversal of orientation substantially suppresses coherent crosstalk. The two transmitter may further be driven at similar but different frequencies, e.g., frequencies that differ by under about fifteen percent. The corresponding receivers are connected to circuits for demodulating each of the received signals at its transmission frequency. Most preferably, each signal is demodulated in phase quadrature and its components are combined to produce an output signal of enhanced amplitude.

In a prototype embodiment used to measure the flow of air in a one inch schedule 40 pipe, signals of 888 kilohertz and 1 megahertz were employed in the two different paths. As illustrated schematically in the Figure, each transducer is coupled to the conduit via a wedge W to define a precise launch angle. The preferred wedge is a low sound speed polymer wedge which converts to, or couples the signal as, a shear wave into the conduit wall, so that leaving the wall, the beam refracts along the path P1 or P2 at an appropriate angle, i.e., an angle to the conduit wall (corresponding to $\theta_3$ of FIG. 2C), through the low density gas in the conduit interior. The transmitter may typically operate in a continuous wave (CW) mode. However, to inject a time reference as would be useful for measuring c, the CW wave maybe coded or otherwise modulated. A similar polymer wedge W and mode conversion receiving geometry at each receiving transducer produces respective receiver output signals $S_{R1}$, $S_{R2}$ which are continuously processed and sorted into multipoint signal value measurement bins, such as successive time ordered sets of 1024 measurement points. The two sets of received signals are then correlated. The correlation processing may be carried out for example as described in commonly owned U.S. Pat. No. 4,787,252 of Saul Jacobson et al., the text of which is hereby incorporated herein by reference in its entirety.

Figure 2A:
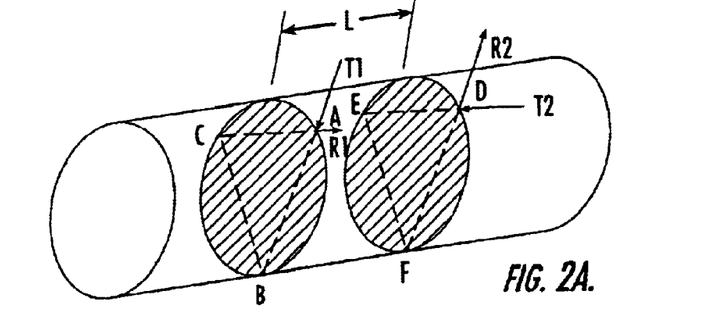
FIGS. 2A–2E illustrate chordal tag measurement systems.

FIG. 2A shows the use of antiparallel paths P1, P2 in a chordal interrogation arrangement. The paths may, for example, be midradius paths, and may include once-or twice-reflected paths. In the illustrated configuration, the respective transmitter/receiver pairs are oppositely-facing, e.g., in clockwise and counterclockwise orientations, respectively.

Referring to FIG. 2A, two parallel measuring planes are spaced axially a distance L. The paths may be referred to as chordal to distinguish them from diametral paths. In this Figure the paths for tag are shown schematically as path ABC associated with T1 and R1, and path DEF associated with T2 and R2. As would be best seen in an end view, the paths may be inscribed congruent equilateral triangles, each interrogated in a sense opposite the other, e.g., clockwise for ABC and counterclockwise for DEF. If the interrogating wave were a pulse of continuous wave (amplitude modulated CW), for example, one cycle of a sine wave, then such a pulse may travel along the fluid path in a time short compared to the time for the fluid in the first plane to flow to the second plane.

Figure 2B:
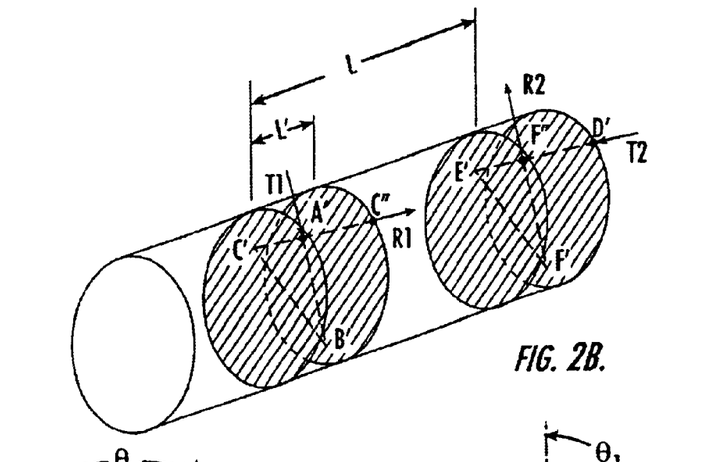
Figure 2C:
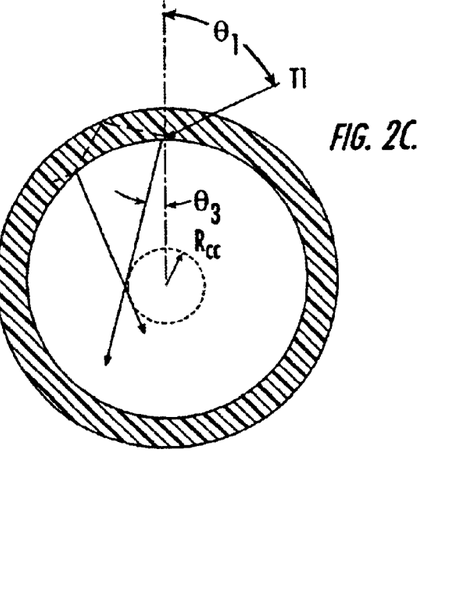

In FIG. 2B, four parallel planes are shown by shading. The interrogating wave now follows a helical path, e.g., in the left region, from T1, the path is A'B'C'C", exiting to R1. The points where this path intersects the two planes are emphasized by dots at points A' and C". The two planes in this left region are spaced L', whereas the important length is L between the first pair of planes and the second pair at the right. The path at the right starting with T2, is: D'E"F'F", exiting to R2. If viewed from the end of the pipe, these paths would be congruent. The directions or senses of interrogation would be opposite, however. The paths both in FIG. 2A and those in FIG. 2B are over twice as long as diameter paths of FIG. 2 and so allow more than twice as much time for crosstalk pulses or waves to decay, before the desired fluid-borne pulse or wave signal is received. In continuous wave mode, the result is that SNR is improved, because one can think of the CW interrogation as being made of the serial superposition of an endless stream of individual cycles from a continuous source of sine waves.

In an application such as air in a steel pipe, the mismatch of acoustic impedance is so great that the wave introduced by transducer T1 primarily stays in the pipe and reradiates many times into the fluid before the energy is totally dissipated. This is illustrated conceptually n FIG. 2C. The wave incident from T1 at incident angle $\theta_1$, in a plane perpendicular to the pipe, gives rise to a first refracted ray at refracted angle $\theta_3$ and that ray proceeds tangent to a construction circle of reduced radius $R_{cc}$. The broken-line path zigzagging around the pipe radiates another ray which typically will also be tangent to the same construction circle, or to one of similar radius. This zigzag model is well known and may be found in patents by Brazhnikov, or by Lynnworth and others, or elsewhere in the technical literature. The chordal paths in FIGS. 2A, 2B thereby interact primarily with eddies or turbulence outside the construction circle, i.e. they exclude a core, while the diameter paths of FIG. 2 interact with the core too. Thus the two interrogations may complement one another and may be used to define the proper meter factor K.

Figure 2D:
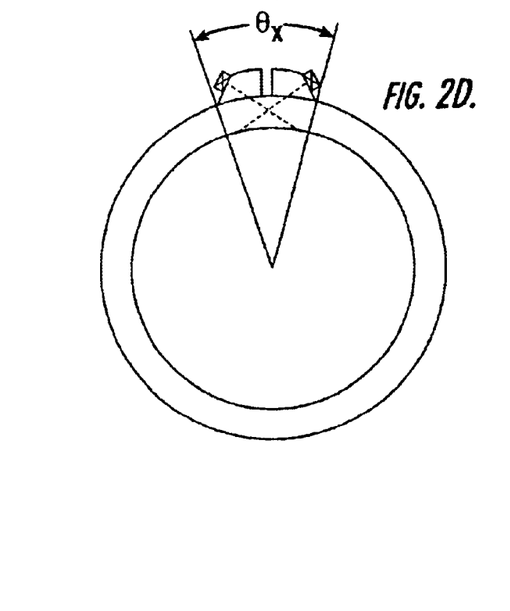
Figure 2E:
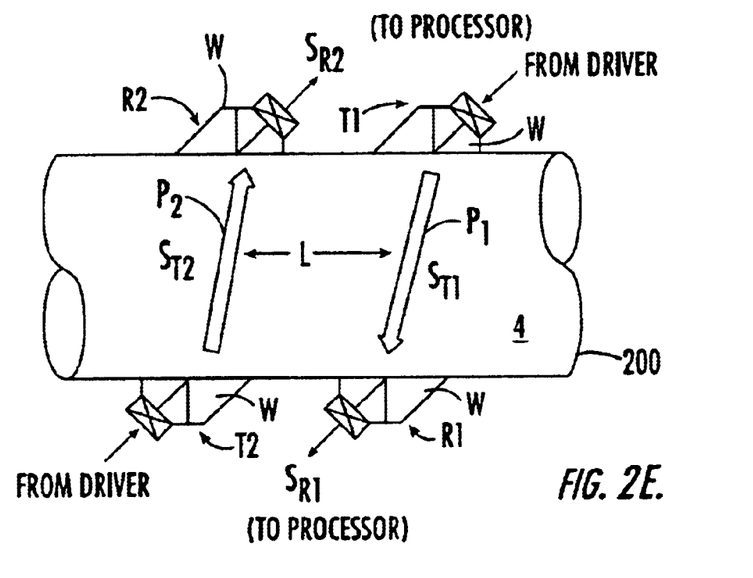

Another characteristic of the chordal paths of FIGS. 2A, 2B is that, in end view, the transducers can all be on one side of the pipe and are contained within a narrow arc corresponding to the angle $\theta_x$ in FIG. 2D. The subtended angle $\theta_x$ is less than or equal to 60° and preferably is less than or equal to 30°. Conduit 200 may be a steam pipe of a building heating system or a process feed gas pipe of a chemical plant. See FIG. 2E.

Figure 3A:
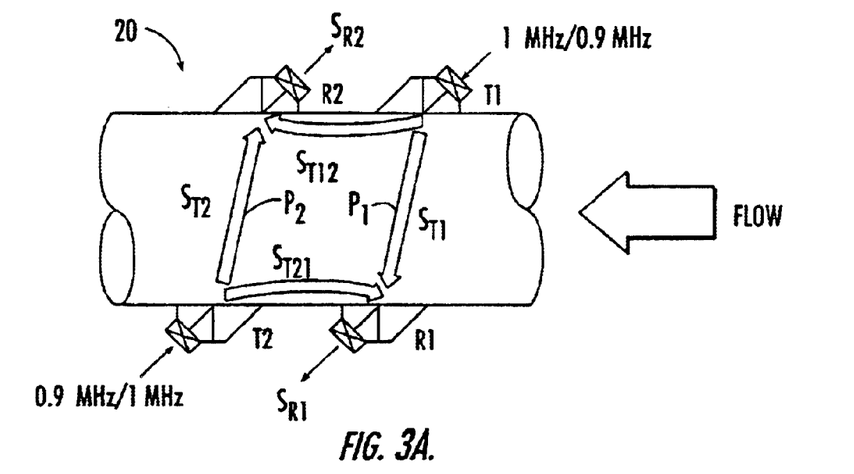
FIGS. 3A and 3B illustrate signal paths and different driving arrangements for the system of FIG. 2.
Figure 3B:
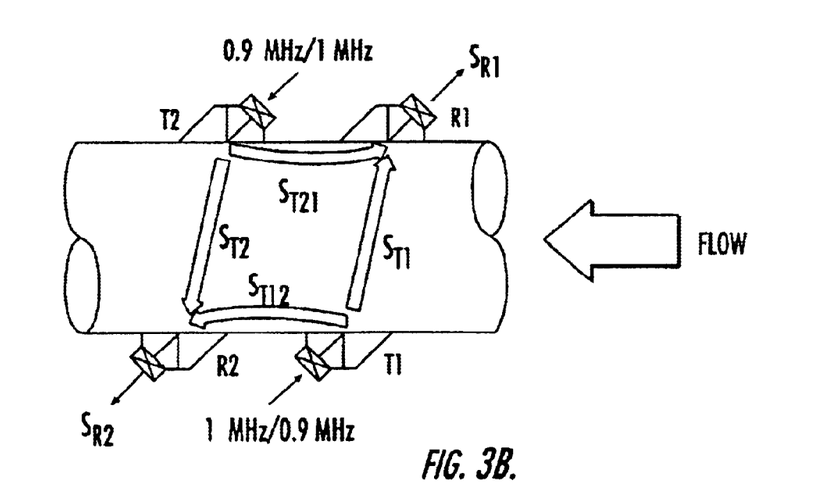

By employing anti-parallel paths between the respective pairs of transmitter and receiver, the caosstalk from one transmitter reaching the receiver of the other path consists entirely of signal passing through the wall of the conduit, and has no contribution or a greatly reduced coherent component in the relevant time widow that has crossed the fluid path or encountered the scatterers of interest for a tag correlation measurement. This situation is illustrated in FIG. 3A where the crosstalk signal $S_{T12}$ from transmitter T1, and the crosstalk signal $S_{T21}$ from transmitter T2 are each shown propagating along the pipe wall to an adjacent receive of the opposite path. The tag correlation measurement depends on the presence of scatterers, and it is immaterial whether the two pairs are upstream or downstream with respect to the flow as seen in FIG. 3A, or vice versa as shown in FIG. 3B. In both cases, interfering crosstalk through the fluid is eliminated resulting in received signals that dependably correlate with a well defined first maximum corresponding to the flow velocity of fluid in the pipe.

Advantageously, applicant has found that the anti-parallel path configuration of the present invention allows the two opposed paths, and the transducers that define those paths, to be spaced quite closely to each other. Thus, for example, the distance L may be two inches or less, even for large (e.g., ten-inch) conduits. Transducers as shown in commonly-assigned U.S. Pat. No. 6,047,602 may advantageousy be used to define even closer diametral or chordal signal paths, and may be positioned in planes transverse to the pipe axis or placed for reflective interrogation paths.

Figure 4:
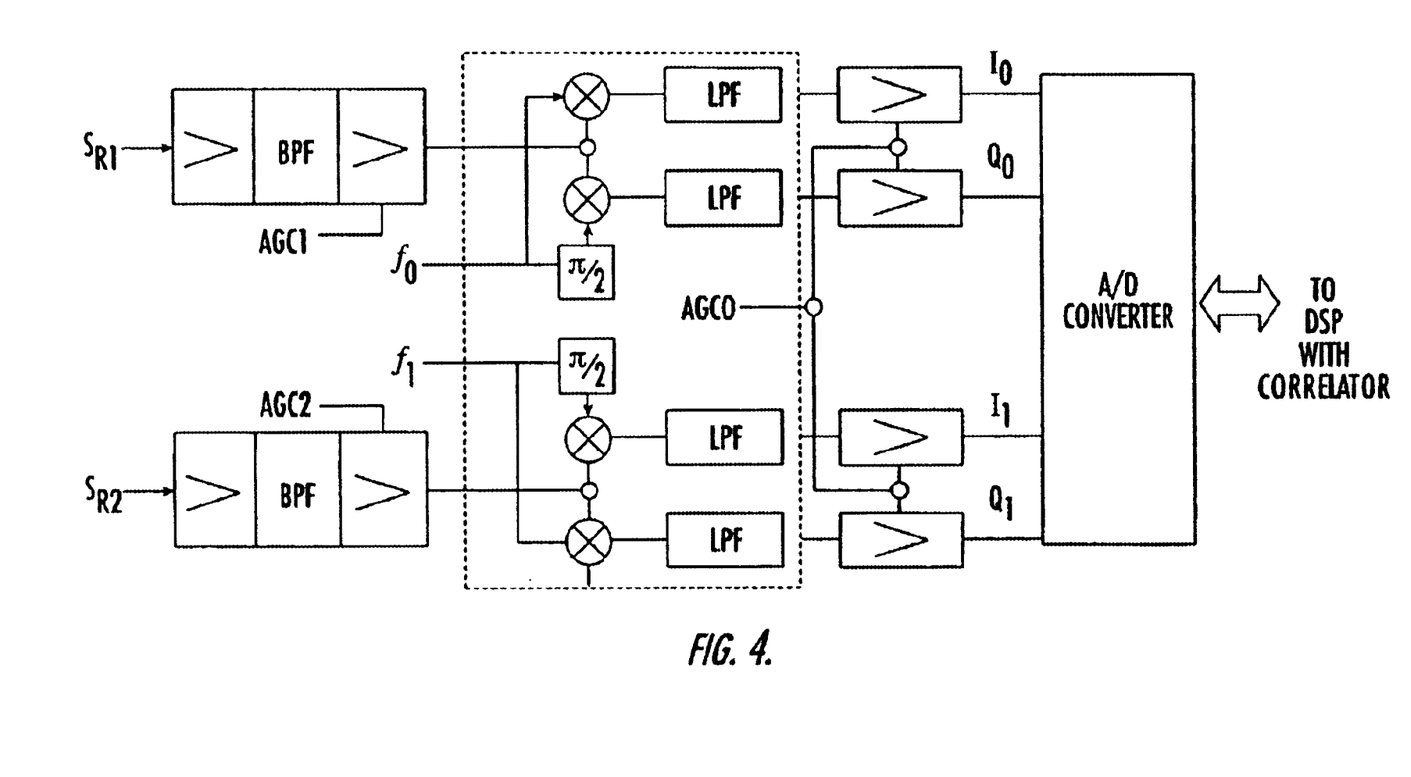
FIG. 4 illustrates a processor used in the system of FIG. 2.

FIG. 4 schematically illustrates a signal detection or demodulation section used for the measurement signal processor in one prototype implementation. The two transmitting transducers T1, T2 are each driven with a different frequency signal $f_0$, $f_1$, and the frequency is set sufficiently high so that the signal traveling through the flowing liquid, multiphase mixture, gas or steam is effectively modulated by the type of inhomogeneities or disturbances that are present in the flow. The two frequencies are also set sufficiently close to each other, e.g., within about ten percent, so that the modulation of both signals by the flow will remain highly correlated. By way of numerical examples, the transducers may be driven frequencies of about 450–475 kHz and 500 kHz, or about 900 kHz and 1 MHz. For smaller conduits, the higher frequency range is preferred both to achieve adequate modulation by the fluid, and for its greater attenuation of crosstalk. As described further below, the separate frequencies permit the received signals to be separately demodulated, without relying on specialized filters, or on physical damping or isolation structures between receivers, to both reduce crosstalk and produce two distinct fluid path signals. In other embodiments, applicant has achieved accurate and repeatable measurements using the same frequency signal for both paths.

The two receiving transducers R1, R2 produce receiver output signals $S_{R1}(t)$, $S_{R2}(t)$, respectively, which are separately quadrature demodulated at frequencies $f_0$, $f_1$, respectively, as shown in FIG. 4. As shown therein, the received signals may be band pass filtered and amplified before quadrature demodulation. The conditioned I, Q signals in each channel may also be low pass filtered and provided as a further input to an A/D converter prior to passage to the digital signal processor for sorting into time-ordered sets of signal values (e.g., $(I^2+Q^2)^{1/2}$) and correlation of the two sets of signals. The correlation processor thus operates by sampling the demodulated output signals at a sampling frequency F, gathering the sample values into successive bins, for example $2^{10}$ signal value sampling points, and then correlating the two received signals in time to determine a peak correlation interval from which the flow rate in the measured region of pipe is readily determined for the given path spacing.

In general, it is desirable that each receiver R1, R2 be positioned under about one pipe diameter along the flow direction from its corresponding transmitter T1 or R2, and further that its beam reception width or aperture along the axial direction be less tan that of the transmitters. The receivers may use a shielded PZT crystal transducer, and a plastic wedge at an angle designed to launch a shear wave at about 70° in the pipe wall, and refract into the fluid at an angle such that the path P1 or P2 is oriented fairly directly across the conduit.

EXAMPLE 1

A test arrangement using atmospheric air as the test fluid was set up to compare signal quality and measurement feasibility of an anti-parallel tag correlation measurement of the invention with that of the Shen-Jacobson measurement configuration described above. Two pairs of transducers were repeatedly installed and uninstalled five times at the same location to determine the efficacy and repeatability of measurements using clamp-on transducers for each of these tag correlation measurements. A one-inch schedule 40 stainless steel (SS) conduit served as the measuring conduit, with transducers spaced on the same side of the conduit 2.7 inches apart. The SS pipe was connected to a 2.5 inch PVC pipe that was used for a reference meter where dependable measurements could be made on a non-ringing conduit wall, and air at substantially atmospheric pressure was forced through the conduit by a fan.

Figure 5:
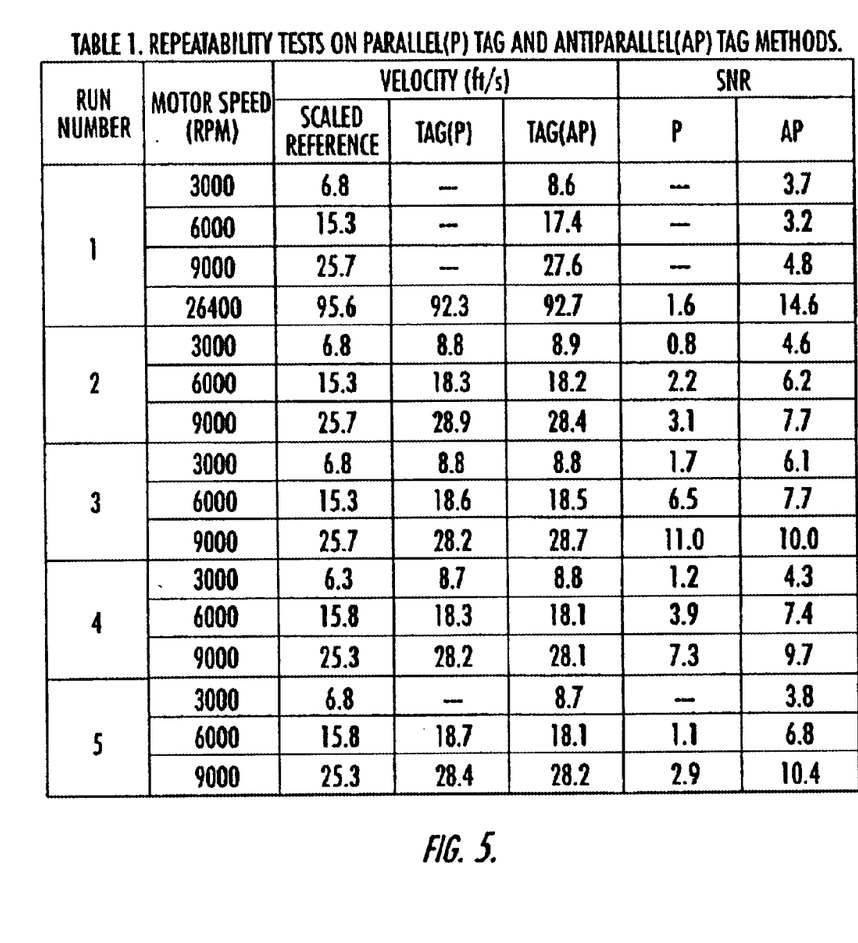
FIG. 5 show a table of tag measurements made in a prototype system of the present invention.

FIG. 5 is a table showing the results of the repeatability tests for transducers arranged to perform a parallel tag correlation measurement (denoted P), and arranged to perform an anti-parallel tag correlation measurement (denoted AP). Motor speeds ranging from 3,000 to 9,000 rpm were employed in each of the five runs, corresponding to scaled reference flow velocities of 6.8 to 25.7 feet per second. The reference meter was a Panametrics' GM868 gas meter using 500 kilohertz CPT transducers clamped on the 2.5 inch PVC pipe, with one reverse path, and using a PRE868-1-40 preamplifier. The fan was a Transicoil 14SH brushless DC motor, with an SE10E drive and a 2.5 inch fan blade.

As shown in the table, flow velocity was unmeasurable in the first run using the parallel tag technique until the flow velocity in the loop was driven to a maximum flow velocity three times above the test range, and in the fifth run it remained unmeasurable at the lowest motor speed. Velocity measurements were comparable using tag or anti parallel tag measurements and were comparable to the scaled measurement. However, significantly the SNR (signal-to-noise ratio) was many times higher using the anti-parallel paths of the present invention. A typical improvement on cross correlation SNR was about five-fold, so that the range of velocities and achievable measurements in the low signal regime and at low flow velocities was appreciably improved.

Figure 6A:
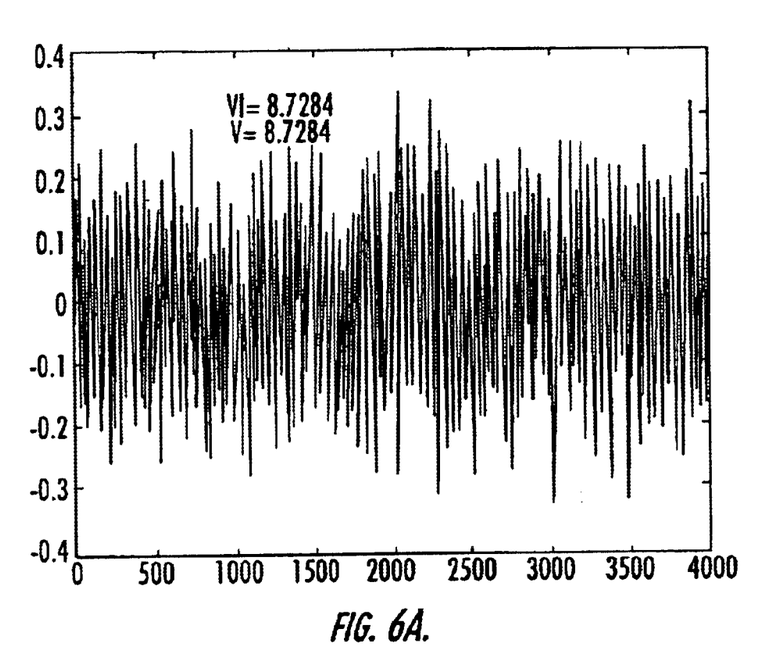
FIG. 6 illustrates range, repeatability and comparability of measurements made with the present invention and with the prior art.
Figure 6B:
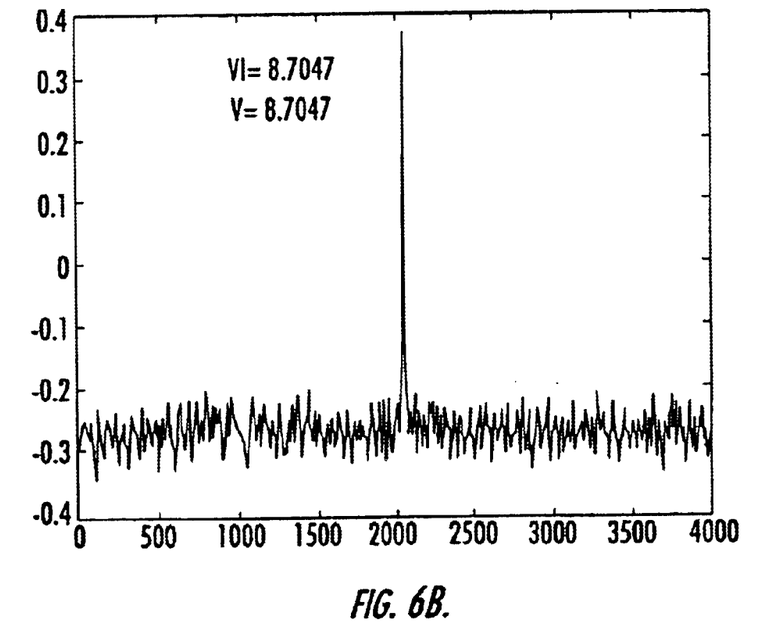

FIGS. 6A and 6B show plots of the tag cross correlations using parallel (FIG. 6A) and anti-parallel (FIG. 6B) signal path arrangements. The X-axis represents the sample number, and the Y-axis is the cross correlation ratio. The test conditions were the same as described in the Table of FIG. 5, and the meter factor was set at K=1 for both tag and the reference. It should be emphasized that the reference was not a calibrated meter but was in fact a clamp-on transducer arrangement on a relatively small, nominally 2.5 inch diameter, pipe with one reverse path. As shown in FIGS. 6A and 6B, the anti-parallel path arrangement produced an extremely narrow peak correlation, which is desirable, with a value substantially higher than all surrounding neighborhoods, while the parallel path arrangement produced a large number of points of high correlation value that were closely distributed on both sides of the true peak, potentially making identification difficult or questionable. Thus, the antiparallel path system produced velocity measurements with a very low uncertainty, whereas the parallel path arrangement resulted in indeterminate or highly uncertain measurements.

In other simulations and tests, applicant has explored an air flow range between about five feet per second and about two hundred seventy five feet per second, or between about $2.5 \times 10^3$ and $1.5 \times 10^5$ in terms of Reynolds number. This is a flow turndown ratio of nearly sixty to one, with the low end being in or very close to the laminar flow regime. While the noted velocities are simply meter readings, and the actual flow rates unknown, the high signal to noise ratio, the definite and distinct correlation, and the repeatability of results indicate that the use of an anti-parallel path for tag correlation is a greatly improved and effective method for flow measurement under these difficult small conduit or high noise conditions. The system has also been found advantageous in tests on water, and on water mixed with a small percentage of air bubbles taken as representative of a two-phase fluid. Clamp-on tests with air have also been conducted successfully on ten-inch PVC plastic pipe using antiparallel paths and Reynolds numbers from about 30,000 to over 150,000, using a vortex meter for reference.

The invention being thus disclosed and illustrative embodiments described herein, further variations and modifications will occur to those skilled in the art, and all such variations and modifications are considered to be within the spirit and scope of the invention as defined herein and by the claims appended hereto and equivalents thereof.

What is claimed is:

1. An ultrasonic measurement system for determining flow of a gas or low density fluid in a conduit, such system comprising:

a first clamp-on transmitter receiver pair configured to define a first ultrasonic signal path across fluid flowing in the conduit and to generate a first tag-modulated output signal;

a second clamp-on transmitter receiver pair configured and mounted to define a second ultrasonic signal path anti-parallel to the first ultrasonic signal path and across fluid flowing in the conduit, said second ultrasonic signal path spaced a fixed distance from said first ultrasonic signal path, said second clamp-on transmitter receiver pair further configured to generate a second tag-modulated output signal; and a processor configured to correlate said first tag-modulated output signal of said first pair with said second tag-modulated output signal of said second pair to determine a time interval representative of flow.

2. The system of claim 1, wherein said first pair operates at a different frequency than said second pair.

3. The system of claim 1, operating in a frequency range above 100 kilohertz.

4. The system of claim 3, wherein said frequency range lies above approximately 900 kilohertz.

5. The system of claim 1, wherein said first pair operates at a frequency different than frequency of operation of said second pair, and receive signals are demodulated at their transmission frequency.

6. The system of claim 5, wherein said first pair operates at a frequency within approximately ten percent of said frequency of operation of said second pair.

7. The system of claim 5, wherein said first pair and said second pair operate in a continuous mode.

8. The system of claim 1, wherein said first ultrasonic path across fluid flowing in the conduit is perpendicular to the axis of the conduit.

9. The system of claim 1, wherein said first ultrasonic path across fluid flowing in the conduit is oblique to the axis of the conduit.

10. An ultrasonic measurement system for measuring flow of gas in a conduit, such system comprising:

first and second clamp-on transmitter receiver pairs configured define first and second transit paths across a conduit, the second transit path being anti-parallel to the first transit path, said first and second clamp-on transmitter receiver pairs further configured to output tag-modulated signals;

a signal processor configured to process signals receive along said first and second paths; and a correlator configured to determine a time interval between the correlated tag-modulated signals on said first and second paths.

11. The system of claim 10, wherein said transducers are coupled to the steam pipe of a building heating system.

12. The system of claim 10, wherein said transducers are attached to a process feed gas pipe of a chemical plant.

13. The system of claim 10, wherein said transducers are attached to a conduit having a nominal diameter under about two inches.

14. A method of measuring flow of steam or gas in a conduit, such method comprising the steps of:

providing a first clamp-on transmitter/receiver pair defining a first signal path across fluid in the pipe such that at a first receiver output is modulated by tags in the fluid;

providing a second clamp-on transmitter/receiver pair defining a second signal path anti-parallel to the first signal path and across fluid in the pipe such that a second receiver output is modulated by tags in the fluid; and correlating the second receiver tag-modulated output with the first receiver tag-modulated output to determine flow rate.

15. The method of claim 14, further including the steps of operating the first transmitter/receiver pair at a first frequency and operating the second transmitter/receiver pair at a second frequency different from the first frequency, wherein the first frequency is sufficiently high to be well modulated by the tags, and the second frequency is close to the first frequency.

* * * * *

UNITED STATES PATENT AND TRADEMARK OFFICE
CERTIFICATE OF CORRECTION

PATENT NO.   : 6,826,965 B1
DATED        : December 7, 2004
INVENTOR(S)  : Liu, Yi It is certified that error appears in the above-identified patent and that said Letters Patent is hereby corrected as shown below:

Title page,
Item [57], ABSTRACT,
Line 4, "scatters in the fluid. The direction of signal propagation in"
should read -- scatterers in the fluid. The direction of signal propagation in --;

Column 3,
Line 37, "tivel" should read -- tively. --;

Column 4,
Line 47, "as would be useful for measuring c, the CW wave maybe"
should read -- as would be useful for measuring c, the CW wave may be --;

Column 5,
Line 61, "pairs of transmitter and receiver, the caosstalk from one" should read -- pairs of transmitter and receiver, the crosstalk from one --;

Column 6,
Line 3, "propagating along the pipe wall to an adjacent receive of the" should read -- propagating along the pipe wall to an adjacent receiver of the --;
Line 66, "direction from its corresponding transmitter T1 or R2, and" should read -- direction from its corresponding transmitter T1 or T2, and --;

Column 7,
Line 1, "axial direction be less tan that of the transmitters. The" should read -- axial direction be less than that of the transmitters. The --;

Column 8,
Line 58, "second pair, and recive signals are demodulated at their" should read -- second pair, and received signals are demodulated at their --;

Column 9,
Line 7, "figured define first and second transit paths across a" should read -- figured to define first and second transit paths across a --;

UNITED STATES PATENT AND TRADEMARK OFFICE
CERTIFICATE OF CORRECTION

PATENT NO.    : 6,826,965 B1
DATED         : December 7, 2004
INVENTOR(S)   : Liu, Yi It is certified that error appears in the above-identified patent and that said Letters Patent is hereby corrected as shown below:

Column 9,
Line 12, "a signal processor configured to process signals receive" should read -- a signal processor configured to process signals received --.

Signed and Sealed this

Seventeenth Day of May, 2005

JON W. DUDAS
*Director of the United States Patent and Trademark Office*